(12) United States Patent
Caldwell (10) Patent No.: US 10,720,166 B2
(45) Date of Patent: Jul. 21, 2020

(54) VOICE BIOMETRICS SYSTEMS AND METHODS

(71) Applicant: SYNAPTICS INCORPORATED, San Jose, CA (US)

(72) Inventor: Frederic Caldwell, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 245 days.

(21) Appl. No.: 15/948,976

(22) Filed: Apr. 9, 2018

(65) Prior Publication Data

US 2019/0311722 A1 Oct. 10, 2019

(51) Int. Cl.
*G10L 17/24* (2013.01)
*G10L 15/30* (2013.01)
*G10L 17/06* (2013.01)
*G10L 17/02* (2013.01)

(52) U.S. Cl.
CPC ............ *G10L 17/24* (2013.01); *G10L 15/30* (2013.01); *G10L 17/02* (2013.01); *G10L 17/06* (2013.01)

(58) Field of Classification Search
CPC ......... G10L 17/24; G10L 15/30; G10L 17/02; G10L 17/06; G10L 17/26; G06F 21/32; G06K 9/00899
See application file for complete search history.

(56) References Cited

U.S. PATENT DOCUMENTS

| | | | |
|---|---|---|---|
| 9,317,736 B1* | 4/2016 | Siddiqui | G10L 17/22 |
| 9,390,726 B1* | 7/2016 | Smus | G10L 15/22 |
| 9,548,979 B1* | 1/2017 | Johnson | H04L 63/0861 |
| 9,641,585 B2* | 5/2017 | Kvaal | H04L 65/605 |
| 9,984,314 B2* | 5/2018 | Philipose | G06K 9/6285 |
| 10,210,685 B2* | 2/2019 | Borgmeyer | G06K 19/0723 |
| 10,305,895 B2* | 5/2019 | Barry | G06K 9/2036 |
| 10,467,509 B2* | 11/2019 | Albadawi | G06F 21/35 |
| 2009/0319270 A1* | 12/2009 | Gross | G10L 15/22 704/246 |
| 2011/0246198 A1* | 10/2011 | Asenjo | B66B 13/26 704/247 |
| 2013/0227678 A1* | 8/2013 | Kang | G06F 21/32 726/19 |
| 2014/0237576 A1* | 8/2014 | Zhang | G06F 21/32 726/7 |

(Continued)

*Primary Examiner* — Mohammad K Islam (74) *Attorney, Agent, or Firm* — Haynes and Boone, LLP (57) ABSTRACT

Systems and methods for user authentication include a microphone generating a corresponding audio input signal, and a voice processing system operable to identify a pass phrase including human speech in the audio input signal, a voice authentication system operable to extract feature characteristics associated with the identified pass phrase, compare the extracted feature characteristics to user voice features, and determine a confidence level of a voice match. The voice authentication system receives a first acoustic code, compares the first acoustic code to a second acoustic code associated with the user, and determines whether the first acoustic code and second acoustic code match. A user is authenticated if the first acoustic code and second acoustic code match and the confidence level exceeds a threshold value. A user device is operable to prompt the user to speak the pass phrase, generate the acoustic code and output the acoustic code through a speaker.

20 Claims, 4 Drawing Sheets

(56) References Cited

U.S. PATENT DOCUMENTS

| | | | |
|---|---|---|---|
| 2014/0307876 A1* | 10/2014 | Agiomyrgiannakis | ................ G10L 21/003 381/17 |
| 2014/0330568 A1* | 11/2014 | Lewis | .................... G10L 15/22 704/273 |
| 2015/0112682 A1* | 4/2015 | Rodriguez | ............. G10L 17/06 704/249 |
| 2015/0134330 A1* | 5/2015 | Baldwin | ................. G06F 21/32 704/232 |
| 2015/0332665 A1* | 11/2015 | Mishra | ............... G10L 15/1815 704/257 |
| 2016/0217321 A1* | 7/2016 | Gottlieb | ............ G06K 9/00308 |
| 2017/0068805 A1* | 3/2017 | Chandrasekharan | ... G06F 3/167 |
| 2017/0110121 A1* | 4/2017 | Warford | ............. H04M 3/5175 |
| 2017/0213268 A1* | 7/2017 | Puehse | ................ B25J 11/0005 |
| 2017/0279815 A1* | 9/2017 | Chung | ................. H04L 63/123 |
| 2017/0323644 A1* | 11/2017 | Kawato | ................... G10L 17/00 |
| 2018/0107866 A1* | 4/2018 | Li | ...................... G06K 9/00288 |
| 2018/0121161 A1* | 5/2018 | Ueno | ..................... G06F 3/0412 |
| 2018/0174600 A1* | 6/2018 | Chaudhuri | ......... G06K 9/00744 |
| 2018/0187969 A1* | 7/2018 | Kim | ........................ F25D 29/00 |
| 2018/0232201 A1* | 8/2018 | Holtmann | ............. G06F 1/3231 |
| 2018/0308487 A1* | 10/2018 | Goel | ................... G10L 15/1815 |
| 2018/0336716 A1* | 11/2018 | Ramprashad | ........... G06F 3/012 |
| 2019/0042871 A1* | 2/2019 | Pogorelik | .......... H04N 5/23219 |
| 2019/0098003 A1* | 3/2019 | Ota | ........................ G10L 17/06 |
| 2019/0197755 A1* | 6/2019 | Vats | ........................ G06T 13/40 |
| 2019/0246075 A1* | 8/2019 | Khadloya | ............. H04N 7/183 |
| 2019/0260731 A1* | 8/2019 | Chandrasekharan | ... G06F 3/165 |
| 2019/0294629 A1* | 9/2019 | Wexler | .................... G06F 16/50 |
| 2019/0295554 A1* | 9/2019 | Lesso | ...................... G10L 17/22 |
| 2019/0311722 A1* | 10/2019 | Caldwell | ................. G10L 17/02 |
| 2019/0313014 A1* | 10/2019 | Welbourne | ......... G06K 9/00221 |
| 2019/0356588 A1* | 11/2019 | Shahraray | ................ G06N 3/08 |

* cited by examiner

VOICE BIOMETRICS SYSTEMS AND METHODS

TECHNICAL FIELD

The present disclosure, in accordance with one or more embodiments, relates generally to voice biometrics, and more particularly for example, to voice biometric systems and methods for voice-interaction devices.

BACKGROUND

Biometric authentication is used in a variety of electronic systems for tasks such as authenticating user and account information in a payment transaction, limiting access to a personal electronics device, and controlling access to one or more physical locations. Advances in biometrics have allowed for increased adoption of biometric authentication in personal devices (e.g., mobile phones, wearables, smart speakers) using technologies such as fingerprint identification, face recognition, iris scanning and voice recognition. However, factors such as hardware and processing limitations and the wide variety of use cases and environments in which these devices may be used can make secure and reliable biometric authentication challenging.

With the proliferation of voice interaction devices such as smart speakers and the popularity of hands-free voice-controlled applications, the demand for voice authentication is increasing. Compared with other biometrics technologies such as fingerprint matching or iris scanning, however, voice biometric authentication systems have relatively high false acceptance rates (FAR) and false rejection rates (FRR). The voice interaction devices may be used in a variety of environments that further reduce the reliability and security of voice biometric authentication. In a controlled, quiet environment, the reliability of voice biometrics may reach an acceptable level, but the reliability drops when the voice controlled device is operated in a noisy environment. Solutions that add costly hardware or hinder the expected user experience of a hands-free, voice-controlled application are not desirable in many applications. As a result, voice authentication remains challenging when used with mobile devices, in noisy environments and/or with applications requiring a high level of security and reliability.

In view of the forgoing, there is a continued need in the art for improved voice biometrics systems and methods that are secure and reliable when used in a variety of devices, applications and environments.

SUMMARY

In various embodiments of the present disclosure, systems and methods for voice biometric authentication are disclosed. In one embodiment, a voice interaction device receives an audio input signal including a user's spoken voice and an acoustic code that uniquely identifies the user. Voice processing components identify speech in the audio input signal, match voice feature characteristics of the speech with known user voice feature characteristics, and generate a confidence score indicating a likelihood that the user has been authenticated. The audio input signal is also processed to acquire the unique acoustic code and verify that the received acoustic code matches a code associated with the user. In one or more embodiments, the user's unique acoustic code is delivered to the voice interaction device while the user is voicing one or more pass phrases, personal identification numbers or other speech to be used for voice authentication.

In one or more embodiments, the user experience is similar to a standard voice authentication process. For example, the user may operate a user device (e.g., a phone), including an interface facilitating interaction with the voice interaction device. Through the interface, the user may be prompted to speak a particular pass phrase for voice authentication. The voice interaction device receives the voiced pass phrase at a microphone, then determines whether the user has been authenticated. In one embodiment, the interface is configured to generate the unique acoustic code associated with the user and output the unique acoustic code while the user is voicing the pass phrase. In various embodiments, the unique acoustic code is output through a speaker of the user device at a frequency that is generally preferred inaudible to humans (or otherwise non-disruptive to the user's use and enjoyment of the user device and voice interaction device). Depending on systems requirements, the unique acoustic code may be a static code identifying the user, a code (e.g., 128 bit number) or token associated with the user that changes periodically (e.g., every minute), or other unique identification code.

In one or more embodiments, the voice biometric systems and methods disclosed herein use acoustic information transmitted by a secure device in the possession of the user while the user is voicing the pass phrase. The use of the acoustic code as disclosed herein makes it more difficult for an unauthorized person to spoof the voice biometric authentication with a recording of the user's voice. In various embodiments, an authenticated voice without an associated acoustic code will fail authentication. The use of a secure device associated with the user also adds to the reliability and security of the systems and methods disclosed herein.

In one or more embodiments, a method for voice biometric authentication comprises a user enrollment process through which the voice authentication systems acquires user information, voice feature characteristics for the user and assigns a unique acoustic code to the user. In one embodiment, the a voice interaction device (e.g., a smart speaker) is accessed through an application on a user's personal device (e.g., a smart phone). The enrollment process may include launching the application, identifying the user, repeating sample voice prompts to acquire feature characteristics for the user's voice that are stored for by the voice interaction device or another device in communication with the voice authentication device, and establishing an acoustic code for future use in voice authentication. The acoustic code may include a pseudo-randomly generated number that changes periodically (e.g., every minute) and is synced with a number generated by the voice interaction device.

In one embodiment, a user instructing a voice interaction device to authorize an electronic payment is requested to authentication his or her identity using voice biometrics. The user may access the application on a smart phone or other user device and read the pass phrase presented to the user. While the user is prompted to voice a pass phrase (e.g., read aloud a phrase or sequence of numbers), the application continuously transmits the acoustic code associated with the user account to confirm that the person speaking is in possession of the user's device and has access to the user's account. The use of the acoustic code increases the security of voice authentication. If the either the acoustic code is not found, or the voice biometrics fails to find a match above a certain degree of confidence, then the user authentication may fail.

In one embodiment, a voice interaction device comprises at least one microphone and audio input circuitry operable to receive audio input signals comprising speech signals and acoustic code signals, and extract or enhance speech and acoustic code information. The audio input processing circuitry is operable to receive audio input from at least one microphone and separate the audio input signal into speech and acoustic code components. In some embodiments, voice authentication is conducted remotely through a network server. The voice interaction device further comprises a voice processor operable to detect speech and execute associated voice commands, including user voice authentication. A voice authentication module receives speech of a sample pass phrase, extracts voice feature characteristics from the received speech and authenticate the user by matching the extracted feature characteristics with stored user feature characteristics.

A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

The present disclosure provides improved systems and methods for voice biometric authentication. In various embodiments, voice biometric authentication incorporates the use of the user's spoken voice combined with an acoustic code generated by a speaker on a user device. A voice interaction device receives an input audio signal from one or more microphones and processes the received speech and acoustic code to authentic the user. By incorporating an acoustic code as disclosed herein, a voice interaction device may seamlessly, securely and reliably implement voice biometric authentication in a variety of use environments, including noisy locations.

As will be understood further from the detailed description below, the present disclosure provides many advantages over conventional approaches. For example, the present disclosure may use existing hardware and features of smart phones and voice interaction devices (e.g., smart speaker or similar devices) to enhance the security of voice biometric authentication. The use of the acoustic code provides additional protection against spoofing over voice biometric authentication alone.

Figure 1:
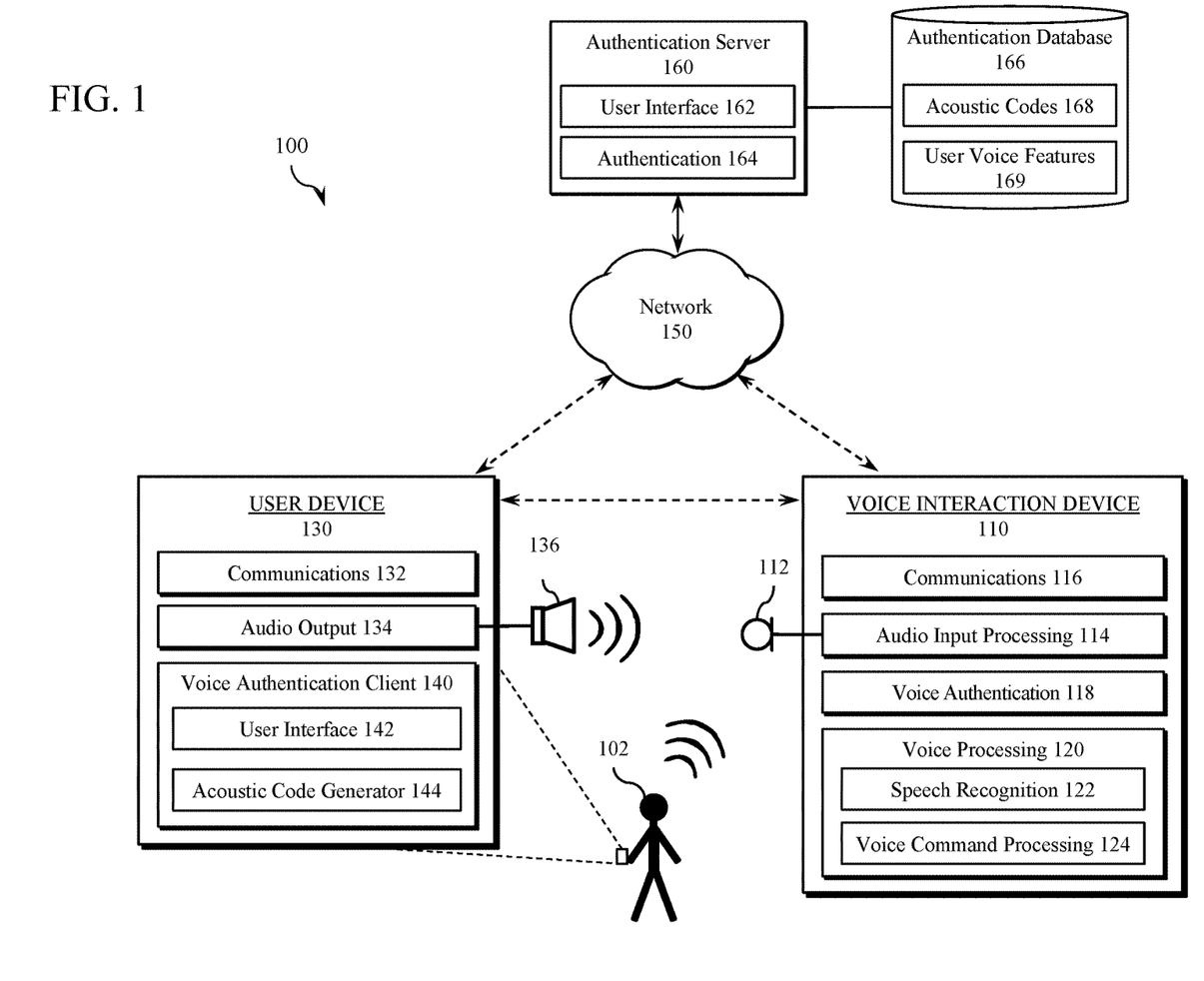
FIG. 1 illustrates an example voice authentication system, in accordance with one or more embodiments.

Referring to FIG. 1 embodiments of the present disclosure will be described. FIG. 1 is a block diagram of an exemplary voice authentication system 100, in accordance with various embodiments of the present disclosure, showing a user 102, a voice interaction device 110, a user device 130, a communications network 150, and a remote authentication server 160.

In various embodiments, voice interaction device 110 may be implemented as a smart speaker, intelligent virtual assistant, smart phone, tablet, laptop computer, wristwatch with appropriate computer hardware resources, eyeglasses with appropriate computer hardware, clothing with wearable technology with appropriate computer hardware, and/or other types of computing devices capable of transmitting and/or receiving data as described herein. Although only one voice interaction device 110 is shown, a plurality of voice interaction devices 110 may be implemented within the spirit of this embodiment. Moreover, in various embodiments, one or more of the applications, processes, and/or features discussed herein in reference to voice interaction device 110 may be included in a communication device connected to voice interaction device 110, or included in one or more servers such as authentication server 160.

Figure 2:
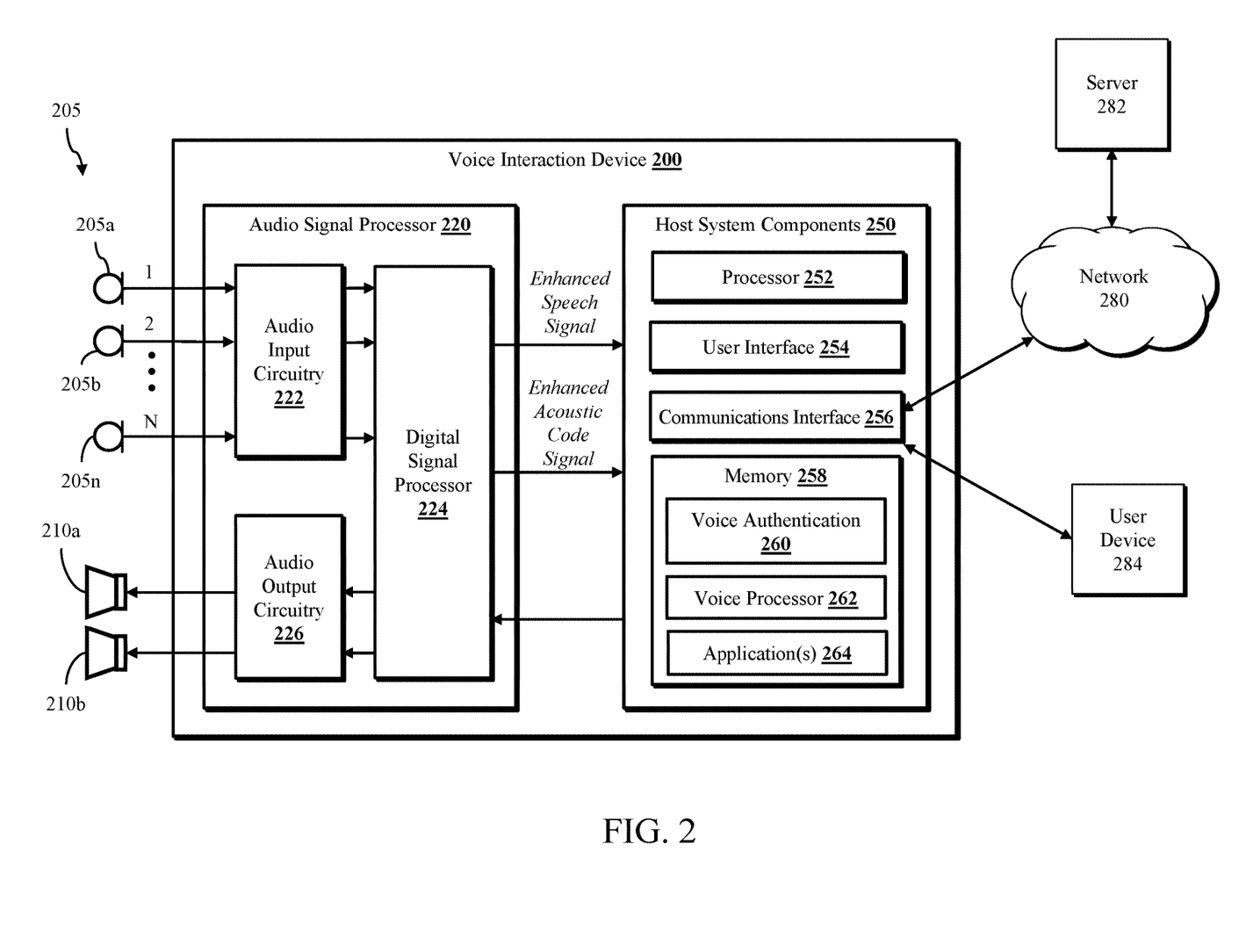
FIG. 2 illustrates example voice interaction device, in accordance with one or more embodiments.

The voice interaction device 110 may include one or more audio sensing components, such as microphone 112, and one or more audio output components (shown in FIG. 2). The voice-interaction device 110 is operable to sense sound from the environment (e.g., a voice authentication phrase spoken by the user 102), via the microphone 112, and generate an audio input signal which is provided as an input to audio input processing components 114. The voice authentication system 100 also includes communications components 116 which may be configured for wired and/or wireless communication with user device 130 and the authentication server 160 through the network 150 (e.g., the Internet or cloud).

The audio input processing components 114 process the audio input signal to detect and enhance a speech signal received from a target audio source, such as user 102, and an acoustic code signal generated by the user device 130. In one embodiment, the audio sensing components include one or more microphones 112 and the audio input processing components 114 include a spatial filter (e.g., a beamformer) that receives the plurality of audio input signals, identifies the direction of the user 102 (i.e. target speaker), and uses constructive interference and noise cancellation techniques to output an audio signal that enhances the speech (e.g., speech) produced by the user 102. The enhanced audio signal may then be transmitted to other components within the voice interaction device 110 or to other devices, such as authentication server 160 via communications components 116, for further processing. In one embodiment, the voice interaction device 110 may capture a baseline of the acoustic properties of the environment (e.g., a room) to facilitate noise suppression and other audio processing.

The voice interaction device 110 includes voice processing components 120 such as a speech recognition engine 122 and voice command processing components 124 for processing voice commands received from the user 102. Voice authentication components 118 facilitate authentication of user 102 through voice biometrics and acoustic code matching as disclosed herein. In one embodiment, the voice interaction device 110 is an intelligent assistant operable to initiate voice authentication for at least one process (e.g., an online payment transaction, change in configuration or security features of the voice interaction device).

The user 102 may be any person within range of the voice interaction device 110 such that speech generated by the user 102, and audio output generated by the user device 130, can be received by the microphone 112. In various embodiments, the operating environment may further include one or more noise sources, such as background conversations between other people, a television, or automobile traffic. The audio input processing components 114 may include noise cancellation and suppression to enhance the target speech from user 102. For example, speech from the user 102 and noise may reach the microphone 112 from different directions, and the location of each audio source may change over time. For example, the user 102 may speak while walking around a room. The audio input processing components 114 may estimate a direction and/or location of the user 102 based on the audio input signals received by the audio sensing component(s) 112 (e.g., an array of microphones) and process the audio input signals to enhance the target audio and suppress noise based on the estimated location.

As illustrated, the user 102 has access to at least one user device 130, which may be implemented using any appropriate hardware and software configured for wired and/or wireless communication with voice interaction device 110 and, in some embodiments, authentication server 160. In various embodiments, user device 130 may be implemented as a smart phone, tablet, laptop computer, wristwatch with appropriate computer hardware resources, eyeglasses with appropriate computer hardware, clothing with wearable technology with appropriate computer hardware, and/or other types of computing devices capable of transmitting and/or receiving data as described herein.

User device 130 includes communications components 132, audio output components 134 including at least one speaker 136, and a voice authentication client 140. In other embodiments, user device 130 may include additional or different modules having specialized hardware and/or software as required. Voice authentication client 140 comprises one or more hardware and software processes to facilitate the operation of voice authentication components 118 of the voice interaction device 110. In one embodiment, the voice authentication client 140 includes a user interface 142 and an acoustic code generator 144.

The user interface 142 provides the user 102 with an administrative interface to manage the voice authentication components 118 and facilitate enrollment, training and voice authentication prompts and instructions (e.g., "repeat the following phrase"). Through the user interface 142, the user 102 can configure voice authentication through authentication server 160. In other embodiments, the voice authentication can be set up directly between the user device 130 and the voice interaction device 110, bypassing the need for access to remote devices. In various embodiments, communications module 116 may include various types of wired and/or wireless network communication components including radio frequency, infrared, Bluetooth, and near field communication devices that facilitate communications with other devices.

The user 102 may access the user interface 142 to initiate an enrollment process in which the user is identified to the authentication server 160. The authentication server 160 may include a user interface components 162 for interacting with user interface 142 of the user device, and authentication components 164 which facilitate the user authentication process in some embodiments. The enrollment process may include identifying the registering the user 102, extracting user voice features 169 which are stored in an authentication database 166, and assignment of a unique acoustic code 168 for the user.

In operation of the voice interaction device 110, the user 102 launches the voice authentication client 140 on the user device 130 and is presented with a pass phrase to repeat. In various embodiments, the pass phrase prompt may be generated by the authentication server 160 for use in matching the user 102's voice to stored user voice features 169. In other embodiments, the pass phrase may be stored securely in one or more of the user device 130 or the voice interaction device 110. The user 102 repeats the pass phrase which is received by the microphone 112.

When the user is prompted to repeat the pass phrase, the acoustic code generator 144 outputs an acoustic code associated with the user (e.g., acoustic code 168 stored in authentication database 166) through the speaker 136, which is also picked up by the microphone 112. The audio input processing components 114 separate the audio input signal into speech and acoustic code components for authentication by voice authentication components 118. The voice processing 120 and voice authentication components 118 identify the pass phrase from the speech component, and compare voice features from the speech component to the stored user voice feature to determine a confidence score. In various embodiments, the user voice features may be stored locally by the voice interaction device 110 and/or other devices.

The voice authentication components 118 also identify the acoustic code received in the audio input signal (i.e. from the acoustic code components) and match the received acoustic code against the user's unique code (e.g., such as stored acoustic codes 168). Authentication will be found if both the user's voice and the acoustic code are authenticated by the voice authentication components 118. In one embodiment, authentication is found if the acoustic code matches the user's acoustic code and a degree of confidence of a voice match between the received speech and user voice features exceeds a threshold selected for a given implementation. In some embodiments, some or all of the authentication processes may be performed remotely at a authentication server 160.

As previously discussed, the acoustic code generator 144 transmits a digital code to the voice interaction device using audio data through the speaker 136. In this regard, the acoustic code generator 144 may include an encoder to encode the acoustic code into a series of digital signals (e.g., chirps) within an audio frequency band, which may be audible or inaudible to human hearing. The coding may be performed using known digital encoding techniques. In one embodiment, the audio code is continuously repeated and each iteration may include a start code, data representing the user's unique acoustic code, and an ending code. In one embodiment, the length of each iteration of the acoustic code signal is a fraction of the expected time period for recording the pass phrase, such that a segment of an audio input signal including the pass phrase will include multiple iterations of the acoustic code.

In various embodiments, the user device 130 may repeat the unique acoustic code while the user is prompted to voice a pass phrase or other command. The acoustic code may include a sequence of pseudorandom numbers that are synchronized with the voice interaction device, a hash code to encrypt the voice biometric, a time-stamped code and other coding information and techniques. The voice authentication components 118 of the voice interaction device 110 include complementary components for decoding and identifying the acoustic code in the received signal. In one embodiment, the acoustic code is pseudorandom number that changes periodically and the acoustic code generator 144 and the voice authentication components 118 are synchronized (e.g., through the authentication server 160) to generate the same acoustic code for the user during voice authentication.

In various embodiments, the acoustic code is output from the speaker 136 at a frequency that is outside the speech frequency bands (e.g., an inaudible frequency band). The audio input processing components 114 may be configured to divide the audio input signal into a first set of frequency subbands comprising speech signals, including the target speech signal from the user 102, and a second set of frequency subbands comprising acoustic code signals, for further processing. The voice authentication components 118 receive the acoustic code frequency subbands, identifies the acoustic code received therein and compares the received acoustic code against a unique acoustic code associated with the user 102 to authenticate the user 102. In various embodiments, the acoustic code generator 144 sends a unique code or identifier that is paired or hashed with the speaker's voicing of the pass phrase.

In various embodiments, the acoustic code may be generated or coded using various acoustic signal coding techniques including digital coding and coding based on frequency, time, and/or phase. Acoustic code can be modified by number of notes, duration of notes, shape of acoustic wave (pulse width, pulse density modulated) and other factors. In one embodiment, the acoustic is at least 128 bits in length to provide sufficient security. The acoustic code may be implemented across multiple frequencies or a single frequency modulated in a certain way. In some embodiments, the authentication code changes periodically and the acoustic code generator 144 includes an algorithm for generating a next acoustic code. The voice authentication components 118 and/or authentication server 160 may be synchronized to generate the same acoustic code for the user 102.

In one embodiment, the acoustic code is synched up with a backend server, such as authentication server 160, for generating the code. For example, the voice authentication client 140 may be paired with the voice interaction device 110. The voice authentication client 140 (and/or voice authentication components 118) may be used to communicate with the authentication server 160 to stay synched with the codes. The initial synchronization and pseudo random acoustic code sequence may be established during the enrollment process or at a later time when the acoustic code is assigned. The voice authentication client 140 may ask the user to repeat certain phrases which are picked up by the microphone 112 and stored as user voice features by the authentication server 160. In some embodiments, the acoustic response of the room is also incorporated into model of an individual person that can be used to identify and authenticate the person speaking either locally or through a remote device or network (e.g., through the cloud).

By combining a unique identifier with voice biometrics the security and reliability of the system is improved over the prior art voice biometric authentication systems. The systems and methods of the present disclosure can produce lower false acceptance rates and lower false rejection rates compared to voice biometric authentication, while maintaining for the user a simple voice authentication interface. The disclosed embodiments also reduce the likelihood of a spoof, because a recording of a user's voice is not sufficient for voice authentication without a simultaneously generated acoustic code. The disclosed embodiments also allow for use of lower confidence levels for voice authentication (e.g., lower confident level of user voice match) while meeting higher authentication and security requirements.

Referring to FIG. 2, an exemplary voice interaction device 200 according to various embodiments of the disclosure will now be described. The voice interaction device 200 includes an audio sensor component 205, at least one speaker 210a-b, an audio signal processor 220 and host system components 250.

The audio sensor component 205 comprises one or more sensors, each of which may be implemented as a transducer that converts audio inputs in the form of sound waves into an audio signal. In the illustrated environment, the audio sensor component 205 comprises one or more microphones 205a-205n (e.g., a microphone array), each generating an audio input signal which is provided to the audio input circuitry 222 of the audio signal processor 220. In one embodiment, the audio sensor component 205 generates a multichannel audio signal, with each channel corresponding to an audio input signal from one of the microphones 205a-n.

The audio signal processor 220 includes the audio input circuitry 222, an optional digital signal processor 224, and audio output circuitry 226. In various embodiments the audio signal processor 220 may be implemented as an integrated circuit comprising analog circuitry, digital circuitry and the digital signal processor 224, which is operable to execute program instructions stored in firmware. The audio input circuitry 222, for example, may include an interface to the audio sensor component 205, anti-aliasing filters, analog-to-digital converter circuitry, echo cancellation circuitry, and other audio processing circuitry and components as disclosed herein. The digital signal processor 224 is operable to process a multichannel digital audio signal to generate an enhanced target audio signal, which is output to one or more of the host system components 250. In various embodiments, the digital signal processor 224 may be operable to perform echo cancellation, noise cancellation, target signal enhancement, post-filtering, and other audio signal processing functions. In some embodiments, the host system components 250 are operable to enter into a low power mode (e.g., a sleep mode) during periods of inactivity, and the audio signal processor 220 is operable to listen for a trigger word and wake up one or more of the host system components 250 when the trigger word is detected.

The audio output circuitry 226 processes audio signals received from the digital signal processor 224 for output to at least one speaker, such as speakers 210a and 210b. In various embodiments, the audio output circuitry 226 may include a digital-to-analog converter that converts one or more digital audio signals to analog, and one or more amplifiers for driving the speakers 210a-210b. In some embodiments, the digital signal processor 224 may reside within the host or on another device.

The voice interaction device 200 may be implemented as any voice-interaction system or apparatus such as, for example, an intelligent voice assistant, a mobile phone, tablet, laptop computer, desktop computer, voice-interaction appliance, set-top box, or automobile. The host system components 250 may comprise various hardware and software components for facilitating the operation of the voice interaction device 200. In the illustrated embodiment, the host system components 250 include a processor 252, user interface components 254, a communications interface 256 for communicating with external devices and networks, such as network 280 (e.g., the Internet, the cloud, a local area network, or a cellular network) and a user device 284 (e.g., a mobile device), and a memory 258. The device 200 may further include a voice authentication engine 260, a voice processor 262 and one or more applications 264.

The processor 252 and digital signal processor 224 may comprise one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. The host system components 250 are configured to interface and communicate with the audio signal processor 220 and the other host system components 250, such as through a bus or other electronic communications interface.

It will be appreciated that although the audio signal processor 220 and the host system components 250 are shown as incorporating a combination of hardware components, circuitry and software, in some embodiments, at least some or all of the functionalities that the hardware components and circuitries are operable to perform may be implemented as software modules being executed by the processor 252 and/or digital signal processor 224 in response to software instructions and/or configuration data, stored in the memory 258 or firmware of the digital signal processor 224.

The memory 258 and other memory components disclosed herein may be implemented as one or more memory devices operable to store data and information, including audio data and program instructions. Memory 258 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory.

The processor 252 may be operable to execute software instructions stored in the memory 258 and other memory components. In various embodiments, voice processor 262 may be implemented in hardware, software instructions executed by processor 252 or a combination of hardware and software. Voice processor 262 includes a speech recognition engine operable to process the target audio signal received from the audio signal processor 220 to identify speech and detect trigger words, voice commands and authentication phrases.

The user interface components 254 may include a display, user input components, such as touchpad display, a keypad, one or more buttons, dials or knobs, and/or other input/output components operable to enable a user to directly interact with the device 200. The user interface components 254 may also include one or more sensors such as one or more image sensors (e.g., a camera) for capturing images and video.

The applications 264 may include a virtual assistant module operable to provide a conversational experience to the target user, adapt the input/output modalities and facilitate the execution of user commands (e.g., voice commands received from the target user). In various embodiments, the virtual assistant module comprises an artificial intelligence based system that receives voice commands from the voice processor 262. Applications 264 include instructions which may be executed by processor 252 and associated data and may include device and user applications that may be initiated by the user and/or virtual assistant module. In one embodiment, the applications 264 include a VoIP application facilitating voice communications with one or more external devices across the network 280.

The communications interface 256 facilitates communication between the device 200 and external devices. For example, the communications interface 256 may enable Wi-Fi (e.g., 802.11) or Bluetooth connections between the voice interaction device 200 and one or more local devices, such user device 284, or a wireless router providing network access to a server, such as through the network 282. In various embodiments, the communications interface 256 may include other wired and wireless communications components facilitating direct or indirect communications between the device 200 and one or more other devices.

Figure 3:
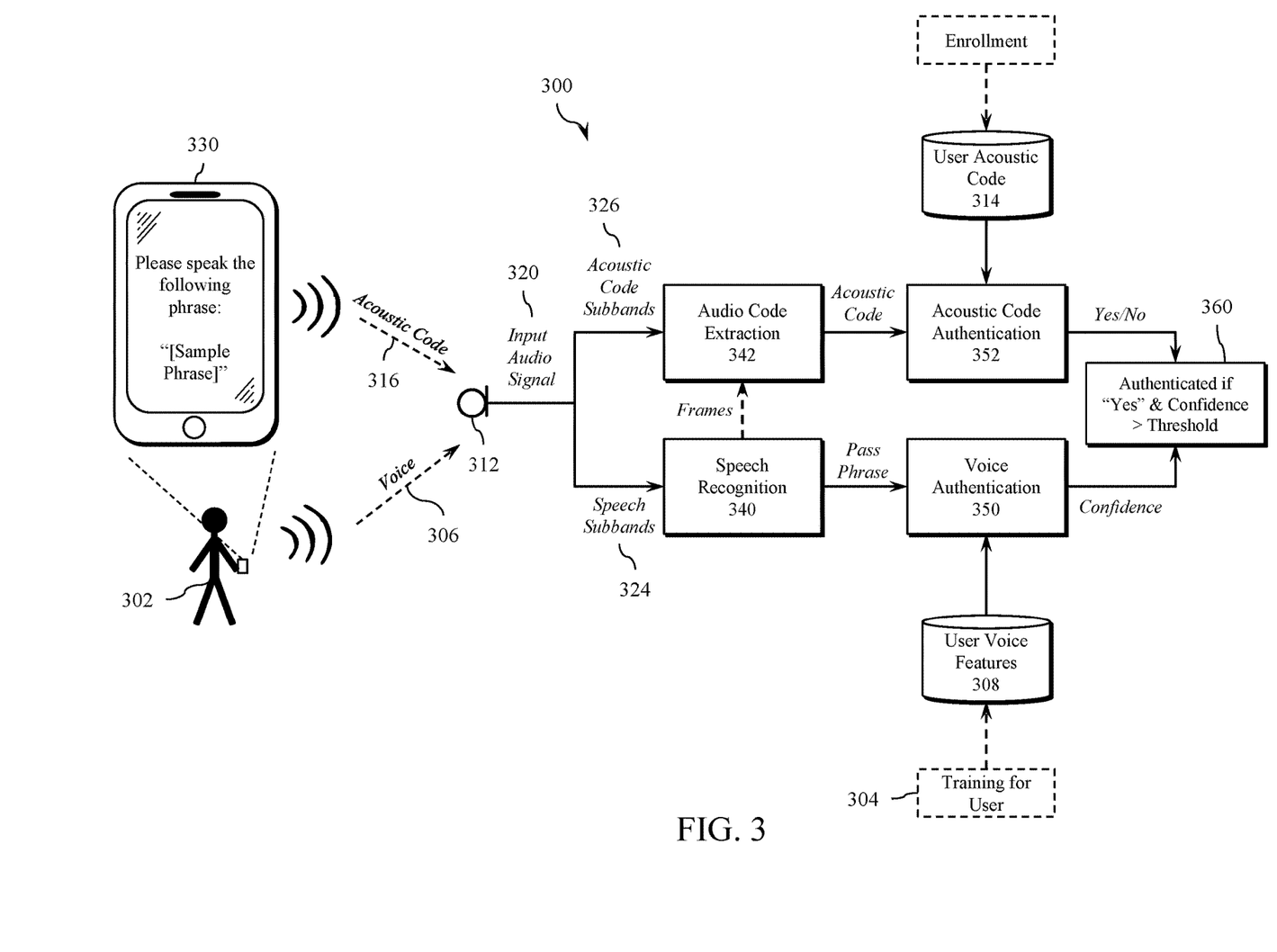
FIG. 3 illustrates an example data flow of a voice-authentication system, in accordance with one or more embodiments.

Referring to FIG. 3, an exemplary data flow of a voice authentication system will be described in accordance with one or more embodiments of the present disclosure. In one embodiment, a user 302 of a voice authentication system 300 enrolls (e.g., establishes a user account) through an application on a user device 330 (e.g., a smart phone). The user device 330 may connect to a server (e.g., authentication server 160 of FIG. 1) to set up a user account and enroll the user for voice authentication.

During the enrollment process, the user 302 may provide identification, user account name, password, and other account information. The user 302 also trains (training process 304) the voice authentication system 300 to recognize the user's voice for authentication. In one embodiment, sample phrases are displayed on the user device 330, the user 302 repeats that phrases that appear and voice samples 306 are received by a microphone 312 of the voice authentication system 300. User voice feature characteristics are extracted from the received voice samples and stored in a memory or database 308. The enrollment process may also include assigning a unique acoustic code to the user 302, which is stored at database 314 with user information within voice authentication system 300 (e.g., a backend server) and on the user device 330. The unique acoustic code and other user information may also be assigned or updated at any time after enrollment.

When the user 302 needs authentication (e.g., to access an electronic device, to initiate an online payment) the user 302 can run a voice authentication application on the user device 330. The user device 330 repeatedly plays an acoustic tone, series of chirps or other audio information that are unique for the acoustic code. At the same time, the user device 330 prompts the user 302 to read text that appears on the screen of the user device 330.

The voice interaction device is listening through the microphone 312 while the application on the user device 330 is running and guiding the user through the voice authentication process, including playing the acoustic code 316. The audible speech from the user 302 (voice 306) and the acoustic code 316 output from a speaker of the user device 330 are both received by the microphone 312 which generates an input audio signal 320. In one embodiment, the input audio signal 320 includes an acoustic code component and a speech component defined by respective frequency subbands. For example, the speech subbands 324 may include frequencies between 200 Hz and 3.4 kHz and the acoustic code subbands 326 may be generated using frequencies above 15,000 Hz. In some embodiments, the acoustic code subbands have a frequency range that is outside the range of human hearing. The acoustic code subbands 326 and speech subbands 324 may be separated, for example, through bandpass filtering.

The speech subbands 324 are passed to a speech recognition engine 340 to identify the presence of the voiced sample phrase, including identifying a speech segment comprising a sequence of audio frames. Corresponding audio frames from the acoustic code subbands 326 are analyzed by the audio code extraction components 342 to identify the presence of a transmitted acoustic code.

Next, an acoustic code authentication is performed by comparing the acoustic code extracted from the input audio signal to the corresponding acoustic code assigned to the user 302. In one embodiment, the output of the acoustic code authentication 352 process is either a "yes" (received acoustic code matches user's acoustic code) or a "no" (a matching acoustic code was not received from the user device 330). Voice authentication 350 is also performed by extracting feature characteristics from the pass phrase received from the speech subbands of the input audio signal and comparing the extracted feature characteristics with the user's voice features stored during enrollment and training. The output of the voice authentication 350 is a confidence score indicating the strength of the match. Finally, the user is authenticated at 360 if the acoustic code is authenticated ("Yes") and the "confidence" of a voice match is greater than a threshold value.

Figure 4:
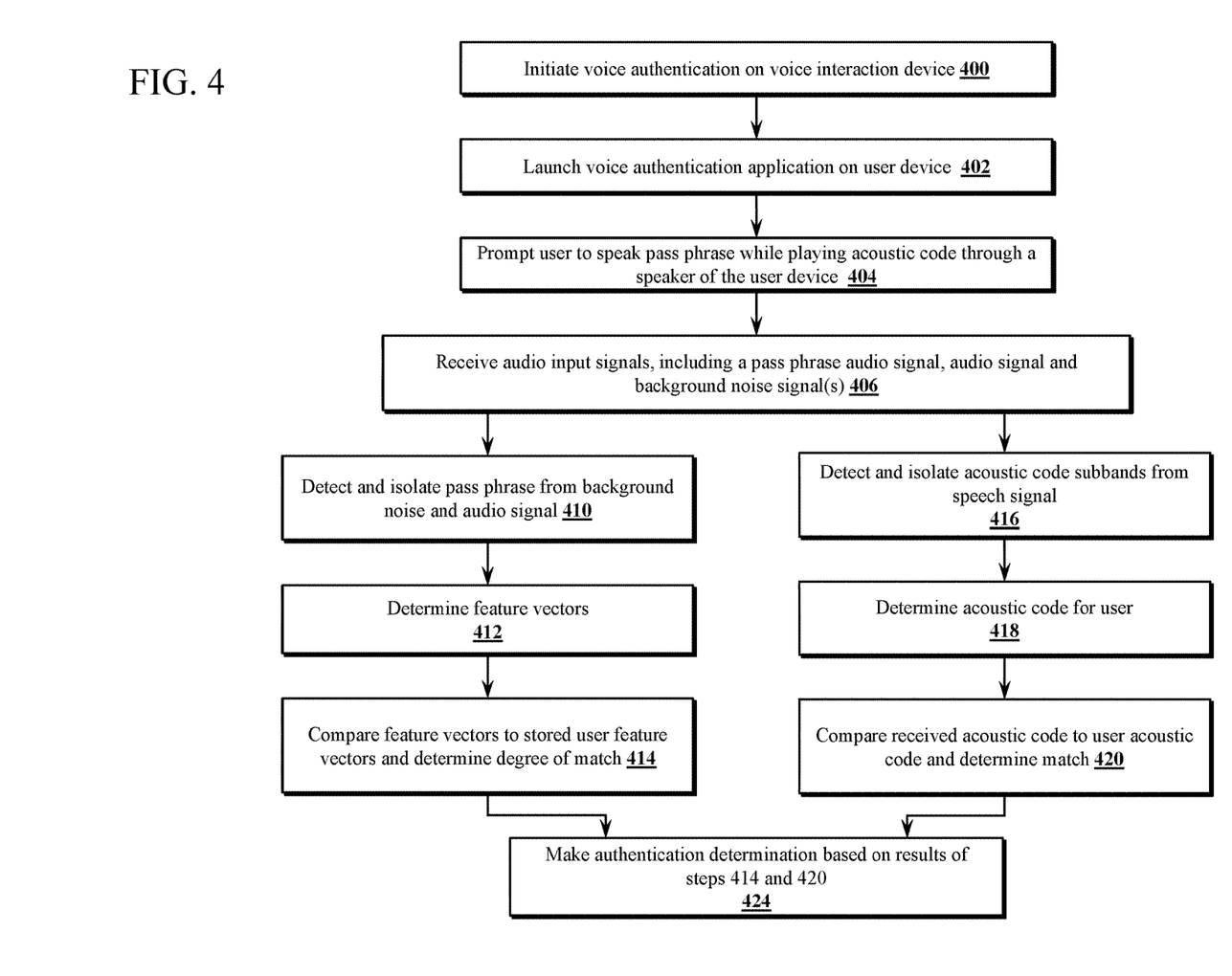
FIG. 4 is a flow chart illustrating an example operation of a voice authentication system, in accordance with one or more embodiments.

Referring to FIG. 4, an operation of a voice authentication system in accordance with one or more embodiments of the present disclosure will now be described. First, a voice authentication process is initiated on the voice interaction device (step 400). For example, a user of a voice interaction device may attempt to access secure features of the voice interaction device, process an electronic payment or initiate other processes requiring user authentication. Next, the user launches a voice authentication application on a user device (step 402). In one embodiment the user may initiate the voice authentication application. In another embodiment, the voice interaction device sends a notification to the user device (e.g., directly or indirectly through a server) to launch the application.

In step 404, the voice authentication application prompts the user to speak a pass phrase while playing an acoustic code through a speaker of the user device. In one embodiment, the user acoustic code is a unique code associated with one or more of the user device and the user. The acoustic code may be played at a low audible level or inaudible level. In some embodiments, the user device is a hardware token that generates an audio signal (e.g., press a button on token to generate a code) while the user speaks.

In step 406, the acoustic code and the user speech are received at a microphone of the voice interaction device. In one embodiment, the voice interaction device includes a plurality of microphones (e.g., a microphone array) and the target speaker's direction and/or location is estimated to enhance the signal. In another embodiment, the direction and/or location of the acoustic signal is also estimated and authentication requires the user device to be located proximate to the user when the pass phrase and acoustic code are delivered to the voice interaction device. In some embodiments, if more than one person is speaking at a time, then the device may identify the user by direction of the user and verify that the device and speaker are coming from the same direction.

In step 410, a speech recognition engine identifies the pass phrase from the audio input signal(s), including a beginning frame and an ending frame. Next, feature vectors for the pass phrase are determined (step 412) and compared against feature vectors for the user's stored biometric voiceprint which was created during a training sequence to determine a degree of match (i.e. confidence score) (step 414).

In step 416, the system searches for an acoustic code in the acoustic code subbands corresponding to the segment of speech with the identified pass phrase (which may include the same frames or additional audio frames at the beginning and ending of the pass phrase). If an acoustic code is found, the acoustic code for the user is identified (step 418) and compared to the received acoustic code (step 420). In step 424, an authentication determine is made. In one embodiment, a user is authenticated if the acoustic code received from the user device matches the user's acoustic code and a confidence level of a voice match is greater than a threshold value.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A system comprising:
  a microphone sensing sound and generating a corresponding audio input signal;
  a voice processing system configured to identify a pass phrase in the audio input signal, wherein the pass phrase includes human speech;
  a voice authentication system configured to extract feature characteristics associated with the identified pass phrase, compare the extracted feature characteristics to user voice features, and determine a confidence level of a voice match;
  wherein the voice authentication system is further configured to receive a first acoustic code generated by a speaker of a user device while the user is voicing the pass phrase, the first acoustic code having a frequency inaudible to humans, compare the first acoustic code to a second acoustic code associated with the user, and determine whether the first acoustic code and second acoustic code match; and wherein the user is authenticated if the first acoustic code and second acoustic code match and the confidence level exceeds a threshold value.

2. The system of claim 1 further comprising a user device comprising a voice authentication application, and wherein the voice authentication application is configured to prompt the user to speak the pass phrase.

3. The system of claim 2 wherein the user device further comprises a speaker; and wherein the voice authentication application is further configured to generate an acoustic code and output the acoustic code through the speaker.

4. The system of claim 3 further comprising audio input processing components configured to extract an acoustic code signal having a frequency range outside of range of speech.

5. The system of claim 3 further comprising audio input processing components configured to extract a speech signal having a frequency range within a range of human speech.

6. The system of claim 2 wherein the user device is a mobile device.

7. The system of claim 1 further comprising an authentication server configured to generate and store the user voice features.

8. The system of claim 1 further comprising a voice interaction device comprising the microphone, voice processing system, and voice authentication system.

9. A method comprising:
receiving an audio input signal;
identifying a pass phrase in the audio input signal, wherein the pass phrase includes human speech;
extracting feature characteristics associated with the identified pass phrase;
comparing the extracted feature characteristics to user voice features;
determining a confidence level of a voice match;
receiving a first acoustic code generated by a speaker of a user device while the user is voicing the pass phrase, the first acoustic code having a frequency inaudible to humans;
comparing the first acoustic code to a second acoustic code associated with the user;
determining whether the first acoustic code and second acoustic code match; and
authenticating the user if the first acoustic code and second acoustic code match and the confidence level exceeds a threshold value.

10. The method of claim 9 further comprising prompting the user to speak the pass phrase.

11. The method of claim 10 further comprising generating the acoustic code and outputting the acoustic code through a speaker.

12. The method of claim 11 further comprising extracting an acoustic code signal from the audio input signal having a frequency range outside of range of speech.

13. The method of claim 11 further comprising extracting a speech signal from the audio input signal having a frequency range within a range of human speech.

14. The method of claim 10 wherein the user is prompted on a screen of a mobile device.

15. The method of claim 9 further generating and storing the user voice features.

16. The method of claim 9 wherein the method is performed by a voice interaction device comprising a microphone, a voice processing system, and a voice authentication system.

17. The method of claim 9 wherein the acoustic code is received in the audio input signal.

18. The method of claim 9 further comprising implementing a training process to generate the user voice features from a set of sample phrases.

19. The method of claim 9 further comprising synchronizing the first acoustic code and the second acoustic code through a server.

20. The method of claim 9 further comprising identifying a first direction of the user generating the pass phrase and a second direction of a user device generating the acoustic code and wherein authenticating the user further comprises comparing the first direction and second direction.

* * * * *